(12) United States Patent
Wang et al.

(10) Patent No.: US 8,442,590 B2
(45) Date of Patent: May 14, 2013

(54) WIRELESS COMMUNICATIONS APPARATUS

(75) Inventors: Yue Wang, Bristol (GB); Cheran Malsri Vithanage, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1158 days.

(21) Appl. No.: 12/352,798

(22) Filed: Jan. 13, 2009

(65) Prior Publication Data

US 2009/0233557 A1 Sep. 17, 2009

(30) Foreign Application Priority Data

Mar. 14, 2008 (GB) .................................. 0804793.8

(51) Int. Cl.
*H04W 16/28* (2009.01)

(52) U.S. Cl.
USPC ..................... 455/562.1; 455/561; 455/550.1; 375/267; 370/203

(58) Field of Classification Search ............... 455/562.1, 455/575.7, 63.1, 114.2, 561, 550; 375/350, 375/232–235, 267; 370/203
See application file for complete search history.

(56) References Cited

U.S. PATENT DOCUMENTS

| | | | |
|---|---|---|---|
| 5,999,800 A | | 12/1999 | Choi et al. |
| 6,377,812 B1 * | | 4/2002 | Rashid-Farrokhi et al. ... 455/522 |
| 7,839,835 B2 * | | 11/2010 | Khojastepour et al. ....... 370/343 |
| 2006/0268623 A1 | | 11/2006 | Chae et al. |
| 2007/0077968 A1 | | 4/2007 | Kuzminskiy |
| 2007/0249403 A1 | | 10/2007 | Gao et al. |
| 2008/0108310 A1 * | | 5/2008 | Tong et al. ...................... 455/69 |

FOREIGN PATENT DOCUMENTS

WO 2007/051154 A2 5/2007

OTHER PUBLICATIONS

P Zetterberg, et al., "Performance of Multiple-Receive Multiple-Transmit Beamforming in WLAN-type Systems Under Power or EIRP Constraints with Delayed Channel Estimates", IEEE 55$^{th}$ Vehicular Technology Conference,vol. 4, Aug. 7, 2002, pp. 1906-1910 (with English Abstract).

* cited by examiner

*Primary Examiner* — Junpeng Chen
(74) *Attorney, Agent, or Firm* — Oblon, Spivak, McClelland, Maier & Neustadt, L.L.P.

(57) ABSTRACT

Determining a beamforming vector for a multi-antenna transmitter commences by determining an eigen-beamformer vector from the channel matrix and, for a number of iterations commencing with the eigen-beamformer vector, rotating the vector into a reference direction in vector space such that application of the rotated vector would result in peak radiation being directed in said reference direction, sampling a radiation pattern associated with the rotated eigen-beamformer vector with respect to transmission direction, compressing resultant samples to reduce spatial directivity induced by the vector, developing a rotated candidate beamformer on the basis of said compressed samples and returning said rotated candidate beamformer to the orientation of said vector before said rotating and storing said resultant vector as a candidate vector. Then, the candidate vectors are compared for the iterations and one is selected for use which best meets one or more selection criteria.

19 Claims, 7 Drawing Sheets (a) Radiation before and after S2

(b) Radiation with phase adjustment (c) Radiation without phase adjustment

WIRELESS COMMUNICATIONS APPARATUS

The present invention concerns wireless communications apparatus, and particularly transmit beamforming for use in arrangements wherein there is an equivalent isotropic radiated power (EIRP) restriction. It is particularly suited to applications involving ultra wideband (UWB) but is not restricted thereto.

Apparatus such as UWB apparatus is, in many regulatory environments, restricted by an EIRP restriction. This means that transmitted power over the whole angular range of an antenna should not exceed a particular value. In general, transmitted power should not exceed a particular level in any particular direction.

Multiple antenna configurations are of potentially significant use in the delivery of multiple input multiple output (MIMO) technology. This has the potential to deliver high data rate and/or robust communication, by exploiting the additional degrees of freedom and diversity afforded by the spatial domain, in addition to the frequency and/or time domains.

It will be appreciated that many problems arise when data is transmitted from multiple antennas simultaneously. For example, a signal received at a corresponding receiver comprises a superposition of the transmitted signals. This results from the nature of transmission over a wireless medium. The superposed signals must be separated by a MIMO detector of the receiver. Some MIMO apparatus aim to use knowledge of the wireless channel at the transmitter to precondition the transmitted message so as to facilitate detection at the receiver. This conditioning is known as beamforming or precoding. In order to be effective, this generally requires a degree of knowledge at the transmitting device of the characteristics of the wireless channel between the transmitting device and the receiving device. This channel knowledge can be ascertained either from a feedback channel dedicated to the transmission from the receiver to the transmitter of such channel knowledge, or by using channel reciprocity, particularly if the communication arrangement between the transmitter and receiver uses time division duplexing.

Whereas optimal preceding algorithms are known, these need to be placed in the context of other performance constraints imposed on MIMO apparatus. In particular, systems such as UWB are restricted by EIRP constraints. This imposes greater restrictions on performance than would a conventional total transmit power constraint. Any beamforming scheme applied at the transmitter for such systems would need to be compliant with regulatory EIRP restrictions.

One particularly useful and commonplace type of beamforming is known as antenna selection. This is investigated in "Performance analysis of combined transmit-SC/receive-MRC," (S. Theon, L. V. Perre, B. Gyselinckx and M. Engels, IEEE Transactions on Communications, vol. 49(1), January 2001).

In that approach, the transmitter consists of multiple antennas, and knowledge of the prevailing condition of the wireless channel is used to determine from which antenna a message should be transmitted. Antenna selection can be applied in wideband systems by using orthogonal frequency division multiplexing (OFDM). In an OFDM system, antenna selection can be performed on the basis of selecting per subcarrier or per groups of subcarriers. Consequently, on any given subcarrier, a particular antenna may be chosen for transmission, whereas another antenna may be chosen for transmission on a different subcarrier. In that way, transmission may be optimised across the bandwidth according to some specified cost (or utility) function. Examples of such functions include instantaneous receive signal-to-noise ratio (SNR), capacity, and uncoded bit error rate (BER). In EIRP constrained systems, such as UWB, it transpires that per subcarrier antenna selection can maximise system capacity in many practical cases, such as where there are only two transmit antennas. This also implies that transmit antenna selection can be, for example, the received SNR optimising scheme when there is only one receive antenna and two transmit antennas.

For more conventional systems which are subject to transmit power constraints, the received SNR optimal beamforming method is the transmission of signals on the principal right singular vector of the channel matrix. If the channel matrix is M, by the term "principal right singular vector", we refer to an eigenvector corresponding to the largest eigenvalue of $M^H M$, where the superscript H denotes the conjugate transpose. This is observed in "Largest eigenvalue of complex Wishart matrices and performance analysis of MIMO MRC systems," (M. Kang and M. S. Alouini, IEEE Journal on Selected Areas in Communications, vol. 21(3), pp. 418-426, April 2003).

Such a beamforming method can be described as eigen-beamforming. Eigen-beamforming increases the directivity of spatial radiation and thus, when implemented in EIRP constrained systems, the transmit power needs to be backed off such that the regulatory EIRP constraints are not violated. This issue is illustrated in FIG. 1, which plots the radiation patterns due to three beamforming schemes. It is assumed that the EIRP should be restricted to be below one unit.

Plots 101 and 102 represent beamforming schemes which transmit the same amount of power. However, the spatial directivity of plot 101 is higher. Thus while plot 102 represents a transmitter which is allowed to transmit at that power, that of plot 101 is required to have its transmit power reduced at least to that shown by plot 103. Thus, any transmission scheme leading to a spatially non-isotropic radiation can incur a transmit power penalty in EIRP constrained systems. This will lead to the result that, with the proper scaling, the eigen-beamforming solution cannot be considered the optimal transmission scheme. The eigen-beamforming vector, when scaled to satisfy the EIRP restrictions, will be called the "scaled eigen-beamforming vector" through this disclosure. Although the use of scaled eigen-beamforming is evidently sub-optimal for EIRP constrained systems, it has been considered as a possible low-complexity beamforming method, for instance in "Performance of multiple-receive multiple-transmit beamforming in WLAN-type systems under power or EIRP constraints with delayed channel estimates" (P. Zetterberg, M. Bengtsson, D. McNamara, P. Karlsson and M. A. Beach, Proceedings of the IEEE Vehicular Technology Conference, 2002). A method of optimising transmit beamforming to maximise received SNR in EIRP constrained systems is presented in Zetterberg et al. However, this optimal method has a high implementation complexity since it involves an optimisation in a complicated multi-dimensional space.

While transmit antenna selection can be optimal for transmitters with only two antennas, both transmit antenna selection and scaled eigen-beamforming are sub-optimal in general. This is unfortunate since many UWB systems operate in low SNR situations where the loss in received signal power due to the use of a sub-optimal beamforming method can significantly affect system performance.

Aspects of the invention provide a method and apparatus for transmit beamforming, which improves the SNR at reception compared with both of the sub-optimal methods described above. The implementation complexity of resultant algorithms when performed on a suitable computer apparatus can be shown to be much less than the optimal method given in Zetterberg et al.

An aspect of the invention provides a method of obtaining a sub-optimal beamforming vector for equivalent isotropic radiated power (EIRP) limited systems with multiple transmitter antennas.

The method may further comprise reducing the spatial peak-to-average power ratio (PAPR) of the radiation generated by the principal right singular vector of the channel matrix.

The method may further comprise iterative soft clipping of the amplitude of the signal after a non-oversampled (i.e., $n_T$-point, where $n_T$ is the number of transmitter antennas) IDFT/IFFT.

The method may further comprise phase rotation of the radiation before/after IFFT/FFT.

The method may further comprise phase adjustment of the signals after non-oversampled FFT and normalisation.

The method may further comprise selecting the beamforming vector that generates the maximum objective function among the vectors obtained in each iteration.

The method may further comprise applying an algorithm that is robust to a range of soft clipping functions.

Another aspect of the invention provides a method of determining a beamforming vector for use in wireless communication involving apparatus comprising a plurality of antennas, each being suitable for emitting a wireless signal, including determining said beamforming vector on the basis of a measure of transmission channel to a given receiver, said measure being expressible in the form of a channel matrix, the determining including determining an eigen-beamformer vector from said channel matrix and, for a number of iterations wherein the initial iteration is performed on a vector being said eigen-beamformer vector, rotating said vector into a reference direction in vector space such that application of said rotated vector would result in peak radiation being directed in said reference direction, sampling a radiation pattern associated with said rotated eigen-beamformer vector with respect to transmission direction, compressing resultant samples to reduce spatial directivity induced by said vector, developing a rotated candidate beamformer on the basis of said compressed samples and returning said rotated candidate beamformer to the orientation of said vector before said rotating and storing said resultant vector as a candidate vector; then comparing said candidate vectors for said iterations and selecting that for use which best meets one or more selection criteria.

Another aspect of the invention provides wireless communications apparatus comprising a plurality of antennas, each being suitable for emitting a wireless signal, and comprising a beamformer operable to determine a beamforming vector for use in wireless communication involving said apparatus, said beamformer including beamforming vector determining means for determining said beamforming vector on the basis of a measure of transmission channel to a given receiver, said measure being expressible in the form of a channel matrix, the beamforming vector determining means being operable to determine an eigen-beamformer vector from said channel matrix and, for a number of iterations wherein the initial iteration is performed on a vector being said eigen-beamformer vector, to rotate said vector into a reference direction in vector space such that application of said rotated vector would result in peak radiation being directed in said reference direction, sample a radiation pattern associated with said rotated eigen-beamformer vector with respect to transmission direction, compress resultant samples to reduce spatial directivity induced by said vector, develop a rotated candidate beamformer on the basis of said compressed samples and returning said rotated candidate beamformer to the orientation of said vector before said rotating and store said resultant vector as a candidate vector, and result comparison means for comparing said candidate vectors for said iterations and to select that for use which best meets one or more selection criteria.

Aspects of the invention may comprise a computer program product comprising computer executable instructions operable to cause a computer to become configured to perform a method in accordance with any of the above identified aspects of the invention. The computer program product can be in the form of an optical disc or other computer readable storage medium, a mass storage device such as a flash memory, or a read only memory device such as ROM. The method may be embodied in an application specific device such as an ASIC, or in a suitably configured device such as a DSP or an FPGA. A computer program product could, alternatively, be in the form of a signal, such as a wireless signal or a physical network signal.

Specific embodiments of the invention will now be described with reference to the accompanying drawings, in which.

Figure 1:
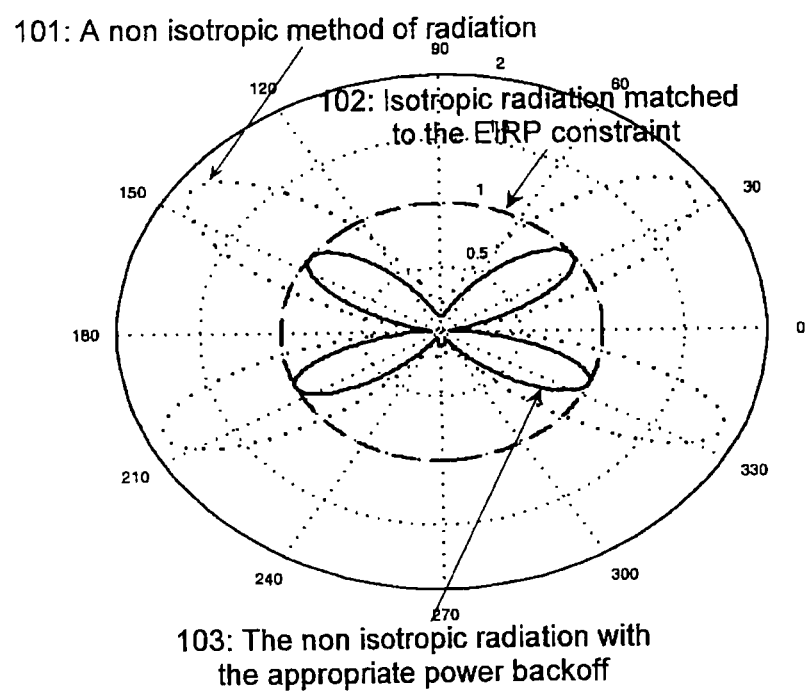
FIG. 1 is a graph of transmission power profiles exemplifying isotropic and non-isotropic radiation profiles from a multi-antenna transmitter.
Figure 2:
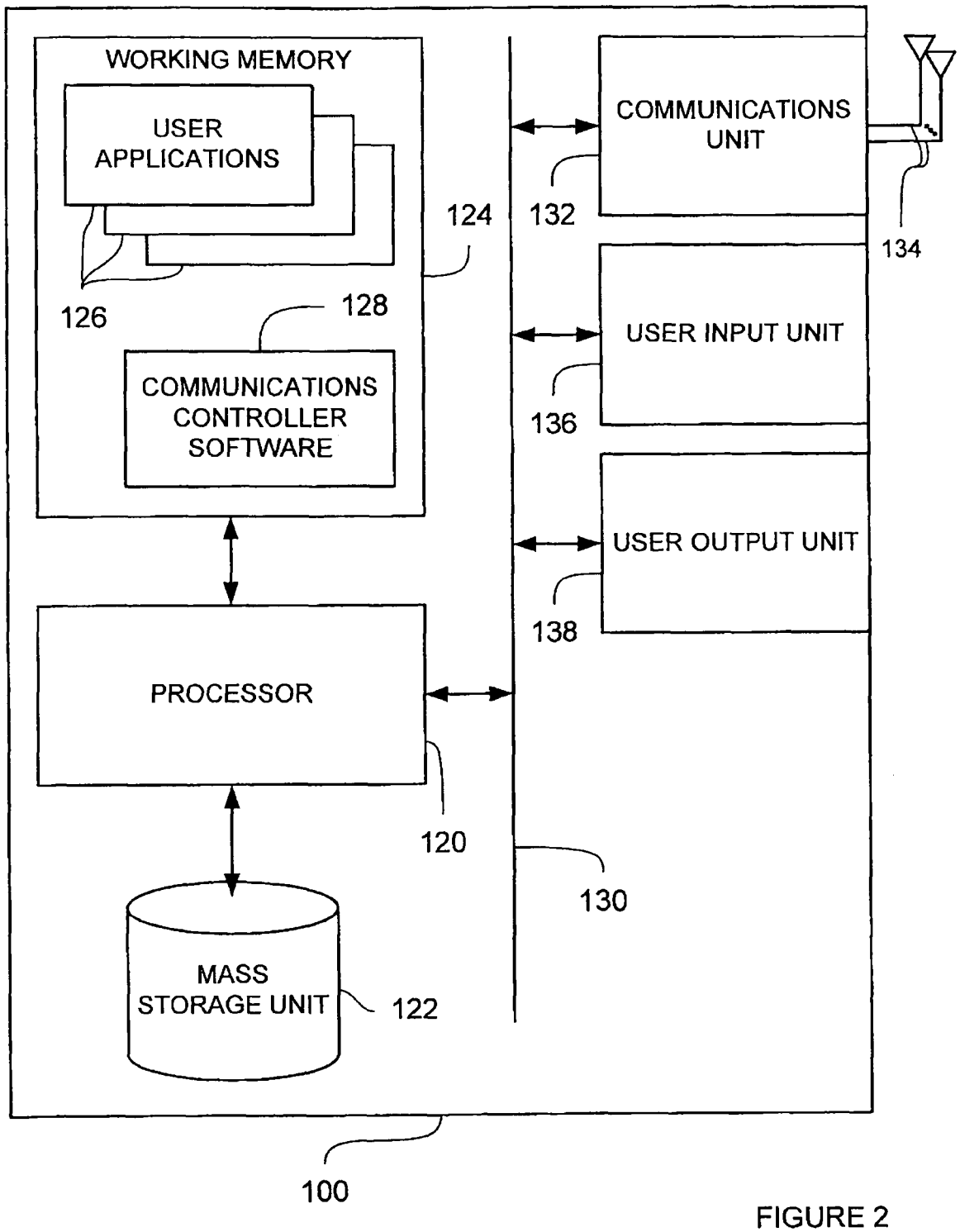
FIG. 2 is a schematic diagram of a wireless communications apparatus incorporating a communications unit in accordance with a specific embodiment of the invention.

The wireless communication device 100 illustrated in FIG. 2 is generally capable of being used in a MIMO context, to establish a MIMO communications channel with one or more other devices and, in accordance with a specific embodiment of the invention, to take account of channel information so as to derive a pre-coding (or otherwise described as beamforming) scheme appropriate to the quality of the channel. The reader will appreciate that the actual implementation of the wireless communication device is non-specific, in that it could be a base station or a user terminal.

FIG. 2 illustrates schematically hardware operably configured (by means of software or application specific hardware components) as a wireless communication device 100. The wireless communication device 100 comprises a processor 120 operable to execute machine code instructions stored in a working memory 124 and/or retrievable from a mass storage device 122. By means of a general purpose bus 130, user operable input devices 136 are capable of communication with the processor 120. The user operable input devices 136 can comprise, in this example, a keyboard and a mouse though it will be appreciated that any other input devices could also or alternatively be provided, such as another type of pointing device, a writing tablet, speech recognition means, or any other means by which a user input action can be interpreted and converted into data signals.

Audio/video output hardware devices 138 are further connected to the general purpose bus 130, for the output of information to a user. Audio/video output hardware devices 138 can include a visual display unit, a speaker or any other device capable of presenting information to a user.

A communications unit 132, connected to the general purpose bus 130, is connected to a plurality of antennas 134. In the illustrated embodiment in FIG. 2, the working memory 124 stores user applications 126 which, when executed by the processor 120, cause the establishment of a user interface to enable communication of data to and from a user. The applications in this embodiment establish general purpose or specific computer implemented utilities that might habitually be used by a user.

Communications facilities 128 in accordance with the specific embodiment are also stored in the working memory 124, for establishing a communications protocol to enable data generated in the execution of one of the applications 126 to be processed and then passed to the communications unit 132 for transmission and communication with another communications device. It will be understood that the software defining the applications 126 and the communications facilities 128 may be partly stored in the working memory 124 and the mass storage device 122, for convenience. A memory manager could optionally be provided to enable this to be managed effectively, to take account of the possible different speeds of access to data stored in the working memory 124 and the mass storage device 122.

On execution by the processor 120 of processor executable instructions corresponding with the communications unit 132, the processor 120 is operable to establish communication with another device in accordance with a recognised communications protocol.

Figure 3:
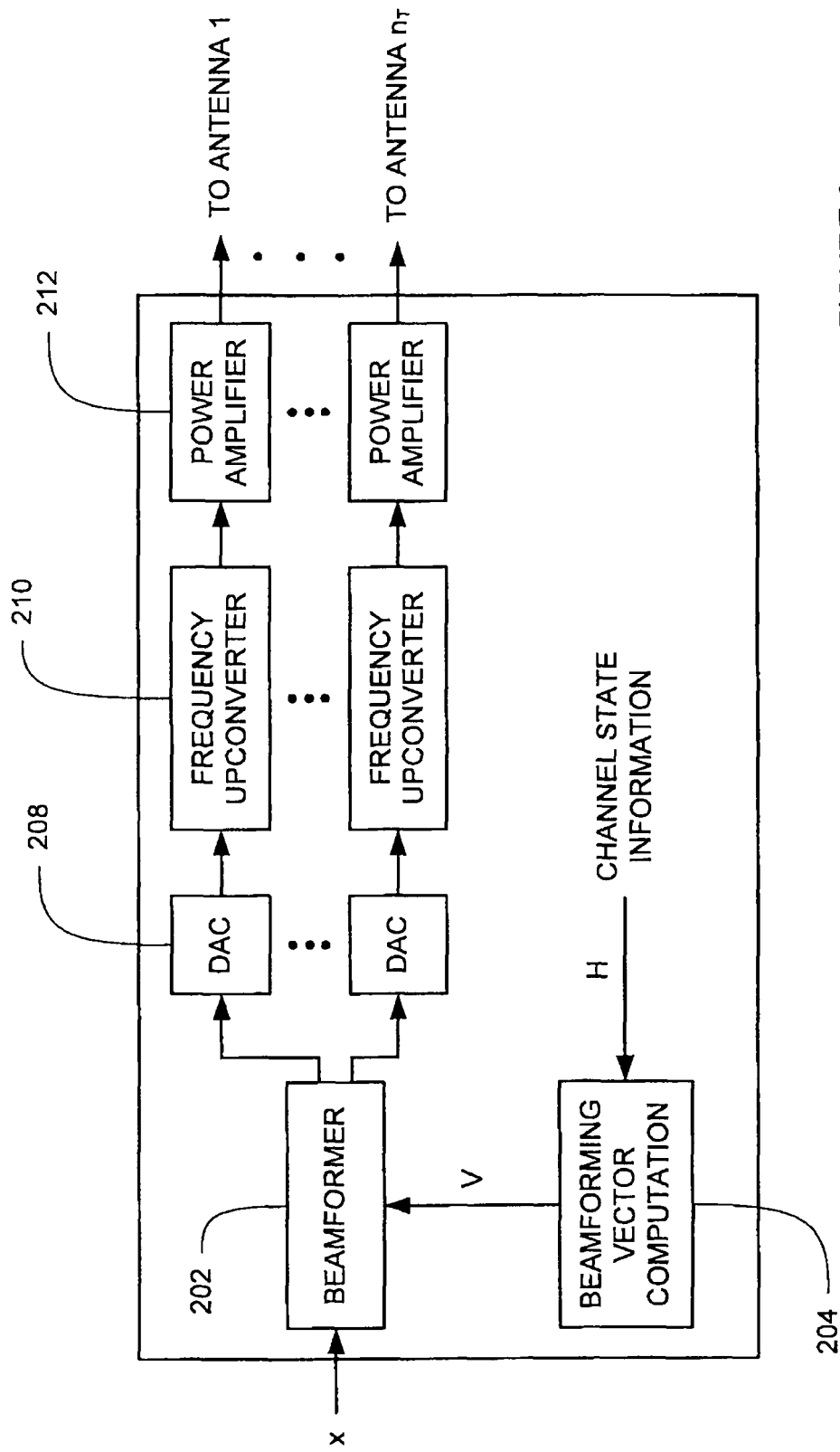
FIG. 3 is a schematic diagram of a communications unit of the specific embodiment of the invention.

The communications unit 132 will now be described in further detail. As illustrated in FIG. 3, baseband and multiple subcarrier versions of the communications unit 132 are exemplified.

In FIG. 3, data (x) to be transmitted is input to a beamformer 202, which is configured by a beamformer vector computation unit 204. The beamformer vector computation unit 204 is itself governed by channel state information (H) which is derived from whatever available source. In many circumstances, a channel estimate will be available from an assumption of channel reciprocity, as the unit will itself be operable as a receiver as well as being a transmitter, or the receiver at the other end of the channel might transmit, for instance on another lower capacity channel, channel information. Such channel information could be transmitted in full, or in a compressed format.

The beamformer produces multiple streams, one for each antenna 134. Each stream is passed to a digital to analogue converter 208, a frequency upconverter 210 and a power amplifier 212. The output of each power amplifier 212 is suitable to be passed to a respective antenna 134.

There now follows an explanation of the function of the beamforming vector computation unit illustrated in FIG. 3. A generic model (for the purpose of illustration of the invention) of a baseband communication system can be described as follows. With $n_R$ denoting the number of receive antennas, the communication system employs $n_T$ transmit antennas. H, which is an $n_R \times n_T$ matrix, denotes the equivalent channel between the transmitter and the receiver. To demonstrate use of the system, it is supposed that, at a particular time instant, the transmitter intends to transmit the scalar symbol x, premultiplied by a $n_T \times 1$ beamforming vector v. Using the $n_R \times 1$ vectors n and y to denote the additive noise manifesting at the receiver and the resultant total signal at the receiver, respectively, $$y = Hvx + n.$$

It will be noted that the elements of the vectors and the matrix above are complex numbers for a baseband representation.

Design of the beamforming vector v is addressed herein. Such design can be made according to various criteria such as maximising the received SNR, maximising the resultant system capacity or minimising the decoded error rates at the receiver. While maximisation of received SNR will be considered from here onwards, it will be apparent to the skilled reader that other objectives could also be considered. Also, the focus will be on transmissions which are constrained by their equivalent isotropic radiated power (EIRP). A signal normalisation will be considered for the system such that its EIRP needs to be constrained below one unit.

The presently described embodiment provides a method of beamforming for EIRP limited systems which is intended to perform more effectively than current sub-optimal methods and at a complexity much less than that of the optimal method given in Zetterberg et al.

The approach is to design sub-optimal beamforming vectors such that, when the vectors are used as the beamforming vector at the transmitter, the resulting radiation will have a reduced spatial PAPR compared to the radiation due to the scaled eigen-beamforming vector. Also, this needs to be achieved by perturbing the scaled eigen-beamforming vector itself.

Figure 4:
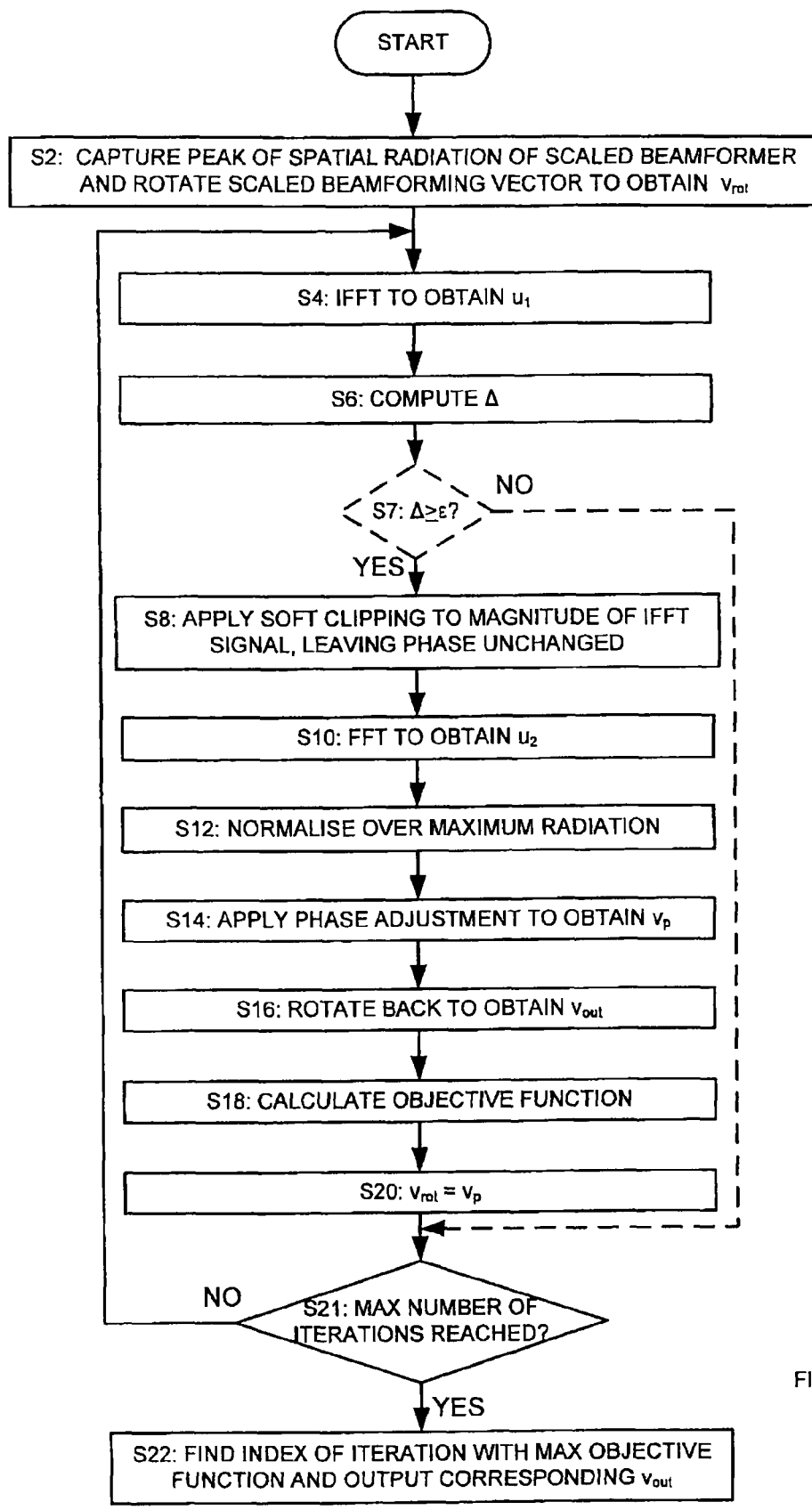
FIG. 4 is a flow diagram illustrating a method of computing beamformer attributes for use by the apparatus in FIGS. 2 and 3.

The flowchart of the proposed algorithm is shown in FIG. 4. The operation of each step is detailed below, where vector $v_p$ is returned for each iteration.

S0: Set the value of $\epsilon$ (optional) and maximum number of iterations. Set PAPR for the first iteration as 0, i.e., $PAPR_0 = 0$.

S2: Induce a phase rotation of $\phi$ degrees to the scaled beamforming vector such that the radiation generated from the resulting vector $v_{rot.SB}$ locates at angle $\Omega = 0$.

S4: Perform an $n_T$-point IFFT on $v_{rot.SB}$ to obtain the length-$n_T$ vector $u_1$ (i.e., $u_1 = \Theta_{n_T} v_{rot.SB}$ where $\Theta_{n_T}$ is the Fourier Transform matrix).

S6: Calculate the PAPR of the amplitude $u_1$ and compare it with the PAPR obtained from the previous iteration, i.e., $\nabla = PAPR_i - PAPR_{i-1}$, where the subscript i denotes the iteration index and PAPR is defined as the maximum value of the amplitudes of $u_1$ divided by the average value of the amplitudes of $u_1$.

S7: If the difference of PAPR obtained from two subsequent iterations reaches a small enough value $\epsilon$ (e.g., $\epsilon = 0.001$), i.e., $\nabla < \epsilon$, go to S22. Otherwise go to the next step. (NB: Dashed lines in the flowchart, i.e., the computation of $\nabla$ and the comparison between $\nabla$ and $\epsilon$ can be omitted if fixed number of iterations is used).

S8: Apply soft clipping to the amplitude of the resulting vector $u_1$ using a soft clipping function. For example:

$$\overline{A}(m) = A(m) - \frac{A^3(m)}{3}$$

where $A(m)$ denotes amplitude of the m th element in the length-$n_T$ vector $u_1$, and $\overline{A}(m)$ denotes the magnitude of the m th element of the signal after soft clipping. Substitute the amplitude by the soft clipped value while keeping the phase unchanged, the m th element of the signal after soft clipping becomes $\overline{A}(m)\exp(j\angle u_1(m))$, with $\angle u_1(m)$ being the phase of the m th element of $u_1$.

S10: Perform an $n_T$-point FFT over the soft clipped signal to obtain the length-$n_T$ vector $u_2$.

S12: Normalise $u_2$ over the maximum radiation to meet the EIRP constraints. Denote the resulting vector as $\overline{u}_2$.

S14: Apply phase adjustment, i.e., find the peak of the radiation generated by $\overline{u}_2$ and rotate the vector such that the peak radiation of the resulting vector $v_p$ occurs at $\Omega=0$.

S16: Rotate $v_p$ back by the same rotation factor $\phi$ in S2.

S18: Compute the SNR obtained for this iteration.

S20: Return $v_p$ as the rotated scaled beamforming vector in S2 for the next iteration.

S21: If the maximum number of iterations has not yet been reached, return to step S4. Otherwise go to S22.

S22: Find the iteration index that yields the maximum SNR and output the corresponding $v_{out}$.

After the sub-optimal beamforming vector is obtained, the beamforming vector computation unit then compares the corresponding value of SNR with that due to antenna selection and the final solution is the vector that yields a higher value of SNR between antenna selection and the approach described above.

It should be noted that, when a fixed number of iterations is used, the dashed parts in the flowchart can be omitted. This reduces the computational complexity of calculating the PAPR and $\Delta$.

As discussed above, it is important, in performing the above method of the specific embodiment, that the designed sub-optimal vector captures the peak position of the radiation due to the scaled beamforming vector. The peak is captured by rotating the scaled beam former such that the peak radiation is aligned at $\Omega=0$ before applying IFFT.

Figure 5:
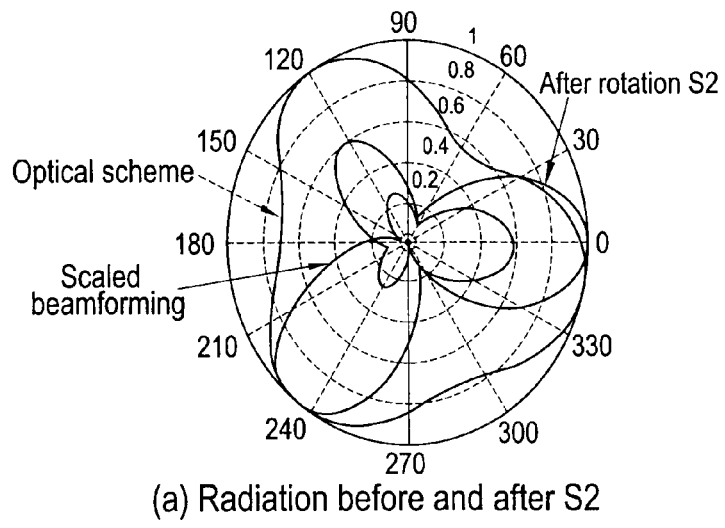
FIG. 5 is a series of graphs of transmission power profiles for use in exemplifying operation of the method illustrated in FIG. 4.
Figure 5:
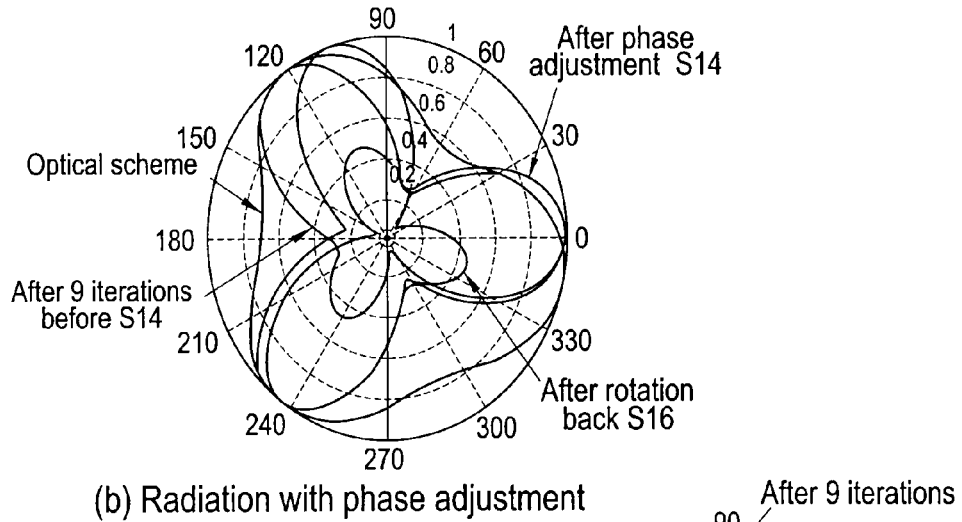
Figure 5:
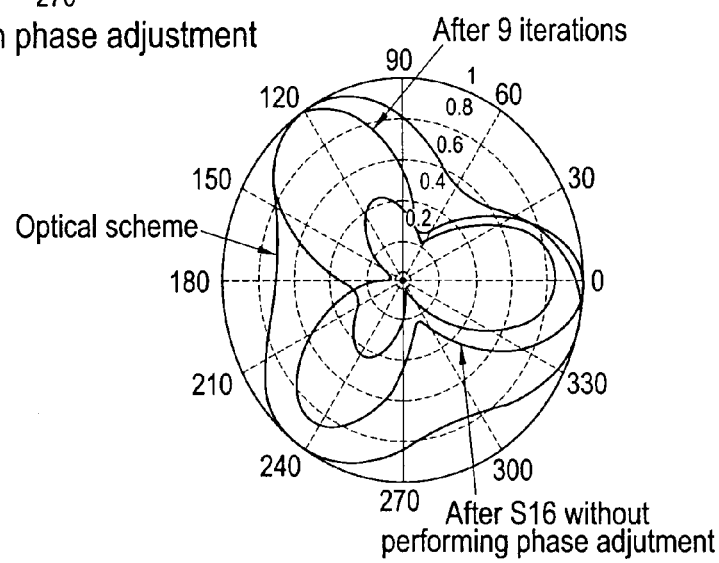

Further, phase adjustment is applied in the above described method and this will be further illustrated using the example set out in FIG. 5.

FIG. 5(a) shows the radiation before and after S2, where the employment of S2 rotates the radiation generated by the scaled beamforming vector, by an angle of $\phi$, resulting in the radiation "after rotation S2" with its peak amplitude aligned at $\Omega=0$. The iterative soft clipping algorithm effectively cuts the main beam and enlarges the side beams to reduce the PAPR of the spatial radiation. It is possible that, after several iterations, the peak radiation does not occur at $\Omega=0$ anymore, since one enlarged side beam could now become the main beam. As is illustrated in FIG. 5(b), the peak of the radiation generated by $u_2$ after 9 iterations now occurs at $\Omega=p_1$ rather than at $\Omega=0$ (See "after 9 iterations before S14"). Therefore, it is necessary to apply phase adjustment as stated in S14 such that the peak of the radiation of the resulting vector still aligns at $\Omega=0$ before applying IFFT for the next iteration.

When the vector is rotated back by $-\phi$ in S16, the peak of the radiation aligns with that of the scaled beamformer (compare the two curves of "scaled beamforming" in FIG. 2(a) and "after rotation back S16" in FIG. 2(b)).

As a further illustration of the relevance of phase adjustment, FIG. 5(c) shows the radiation without phase adjustment S14. It can be observed that the resulting radiation ("after S16 without performing phase adjustment") does not preserve the peak of the radiation of the scaled beamformer. Therefore less energy has been allocated to the position where best channel condition locates, and SNR will suffer.

Figure 6:
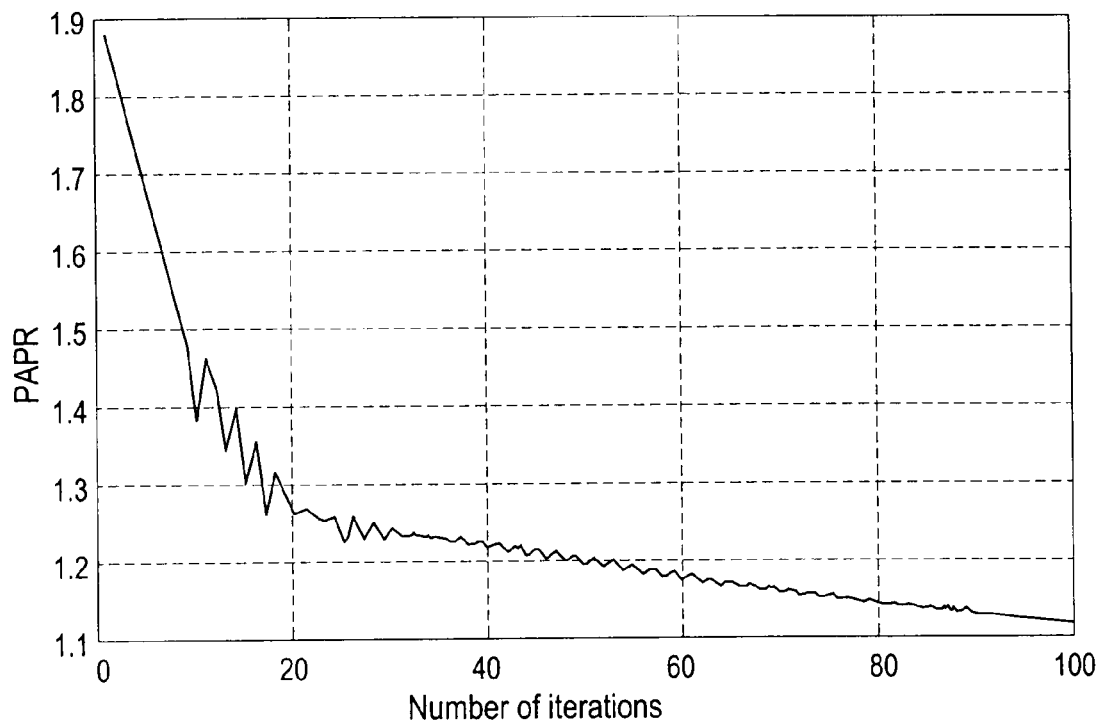
FIG. 6 is a graph of PAPR against iterations employed of the method of FIG. 4.

The described algorithm, as to be implemented by the beamforming vector computation unit, includes consideration of stopping criteria. This takes account of the fact that the number of iterations is a major factor affecting the computational complexity of the algorithm. FIG. 6 shows an example of the spatial PAPR of the radiation generated by signal $u_1$ v.s. the number of iterations.

Figure 7:
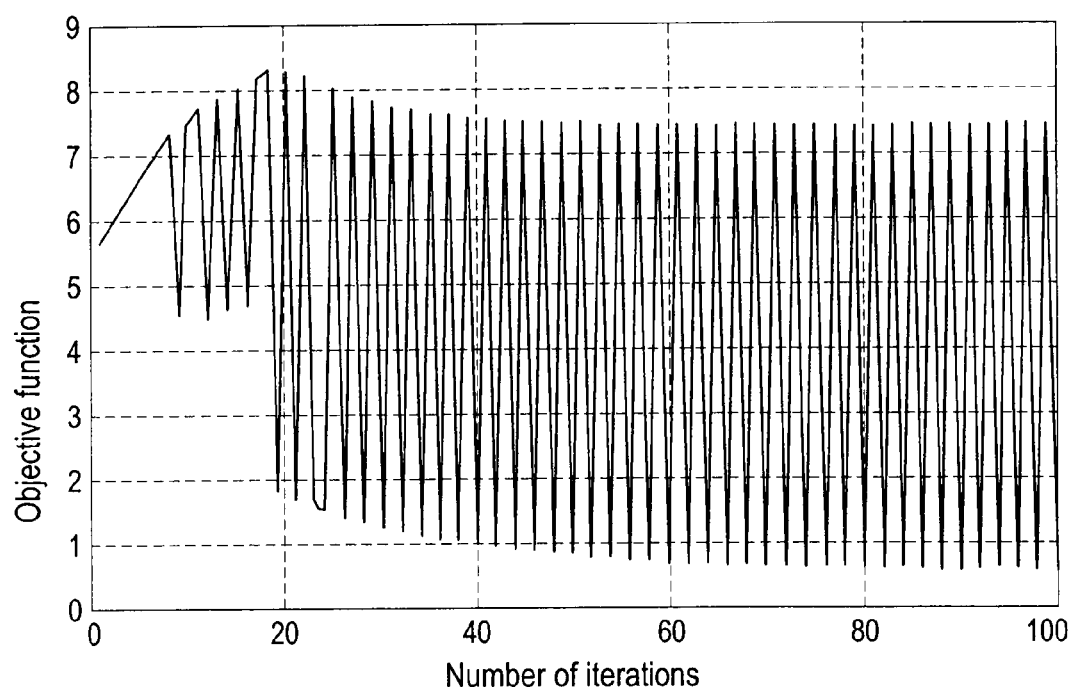
FIG. 7 is a graph of objective function result against iterations employed of the method of FIG. 4.

It will be observed from the graph that the spatial PAPR converges as the number of iterations increases. However, the vector with the lowest PAPR does not necessarily guarantee that the maximum SNR is reached, as is shown in FIG. 7, where the maximum value of SNR is achieved at the 20th iteration while the lowest PAPR occurs at the 100th iteration or more. Therefore, when the maximum SNR has been reached, increasing the number of iterations simply increases the complexity without yielding any SNR gain. On the other hand, it is observed that the SNR achieves its maximum after several iterations and its envelope then becomes relative stable when the PAPR starts to converge.

Therefore, it is observed that it is appropriate to run a sufficiently large number of iterations and to pick the maximum SNR among those obtained after these iterations. In the above described method, the stopping criterion imposed on the method is as to when the difference of the PAPR between two subsequent iterations is less than or equal to $\epsilon=0.005$. It should be noted that selecting the sub-optimal vector $v_{out}$ as the one that yields the maximum SNR is important because simply stopping at a pre-defined number of iterations may end up with a relatively small SNR, since the value of SNR fluctuates as the number of iterations increases (FIG. 7).

The illustrated simulations show that when the stopping criterion as described herein is applied, the average number of iterations is 21.75, and it can achieve comparable BER and PER performance as that with 50 iterations using the same algorithm without applying the stopping criteria. Also it is to be noted that $\Delta<\epsilon=0.005$ is a relatively stringent criterion. In practice, a larger value of $\epsilon$ can be used to reduce the number of iterations with only a slightly degradation in performance in terms of BER and PER. It is also possible to use a fixed number of iterations as long as the number of iterations is large enough to reach a stable PAPR. The approach of using a fixed number of iterations follows the same flowchart as in FIG. 4 except that the dashed parts will be omitted. This reduces the complexity of computing PAPR for each iteration.

Figure 8:
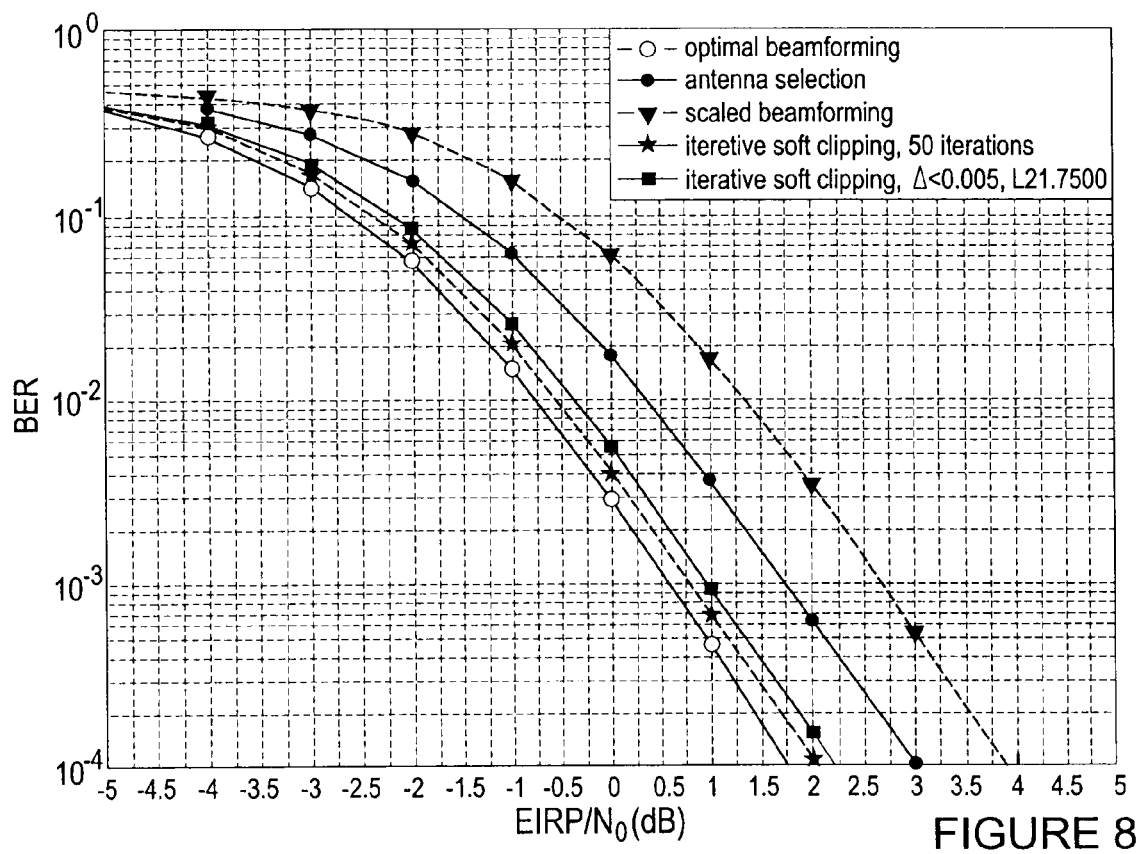
FIG. 8 is a graph of bit error rate against EIRP for simulations of various examples, including a specific embodiment of the invention.
Figure 9:
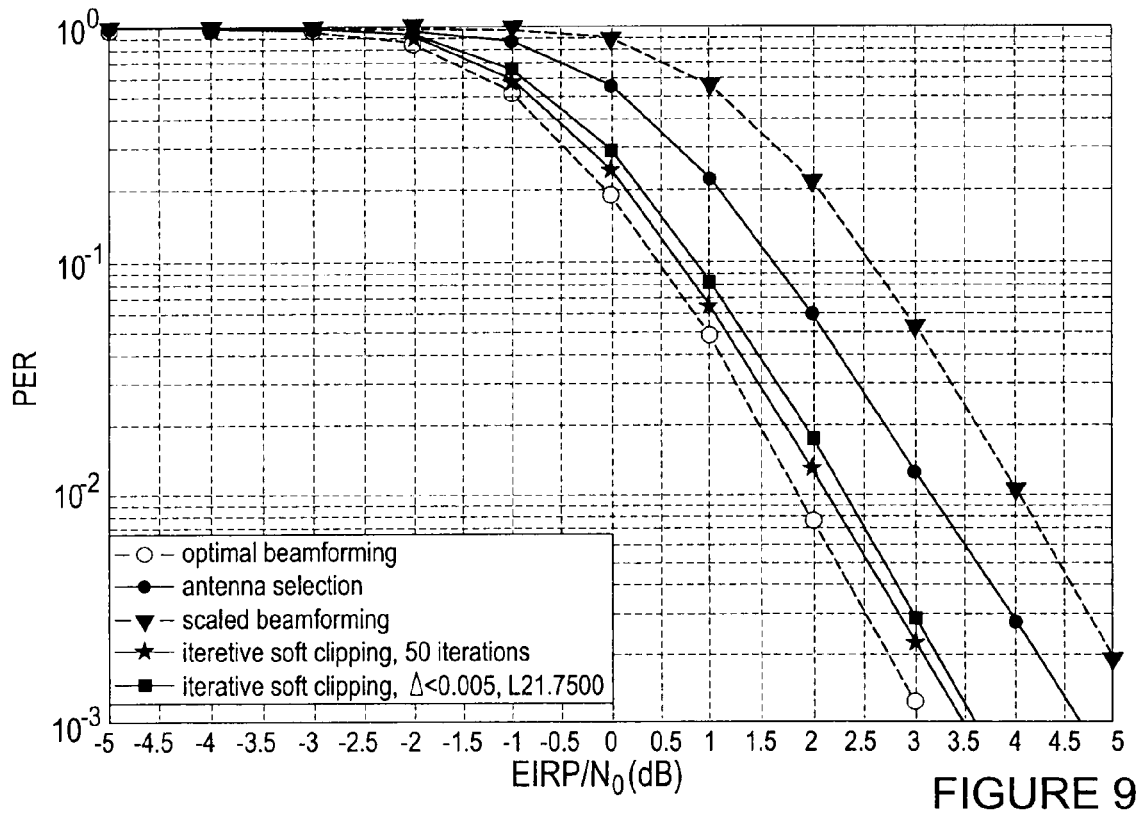
FIG. 9 is a graph of packet error rate against EIRP for the simulations of FIG. 8.

In the above approach, an $n_T$-point IFFT is used, as compared to an oversampled IFFT in conventional clipping methods to reduce PAPR for continuous time domain OFDM symbols, this saves the computational complexity compared to the conventional PAPR reduction algorithms in OFDM transmission, while yielding a performance with only a slight degradation (<0.5 dB) compared to the optimal beamforming method, as can be observed in FIGS. 8 and 9. An $n_T$-point FFT is also used (S10 in FIG. 4) to convert the soft clipped signal to the frequency domain.

Normalising the vector over the maximum radiation to satisfy the EIRP constraints (S12 in FIG. 4) requires the computation of the radiation generated by the said vector. The radiation is obtained by performing an IFFT over the said vector. The size of the said IFFT needs to be large enough to get sufficient resolution of the radiation. In the present example, the size of IFFT for normalisation is 128.

The reader will appreciate that many soft clipping functions are available and the parameters of the soft clipping function used in this algorithm are also adjustable. Different clipping functions can yield substantially the same performance as that chosen, as long as the number of iterations is sufficiently high as to reach the maximum value of the SNR.

It will also be noted by the reader that the parameters of the soft clipping function could be changed for each iteration such that the PAPR may converge faster and the number of iterations may be reduced, but this is at the expense of an increased complexity of designing the parameters/functions as well as to change the software/hardware configurations for each run.

As shown in FIGS. 8 and 9, the above described method of the specific embodiment provides a performance very close to (0.5 dB degradation in the BER and PER performance when 50 iterations are used) that by using the optimal beamforming vectors, while to generate the optimal beamforming vectors, numerical method using specific programming tools such as MATLAB needs to be used, which is usually not desired in practice.

Rather than using oversampled IFFT as in traditional algorithms in reducing the PAPR of the continuous time domain OFDM symbols, non-oversampled IFFT is used in obtaining the time domain signal before reducing the spatial PAPR due to the scaled beamforming vector in the presently disclosed examples d. Therefore, this approach has a reduced complexity in comparison with that using the oversampled IFFT, yet suffers no performance degradation in terms of BER and PER.

The presently disclosed approach contains phase adjustment of the signal after FFT such that in each number of iteration, the peak of the radiation is aligned at $\Omega=0$. Therefore, the peak position of the scaled beamforming vector is retained in the designed sub-optimal beamforming vector, and the main beam is "radiated" to the position where better channel locates.

As shown in FIGS. 8 and 9, simulations of the above described approach have been made in conformity to the OFDM based WiMedia specifications for UWB systems. Since the EIRP restrictions apply per subcarrier for such systems, the beamforming in those simulations was also applied per subcarrier. The number of receive antennas was 1, and the transmit antenna array consisted of four antennas which were spaced apart by 5 cm. The bit error rate (BER) and packet error rate (PER) are plotted against the ratio between the EIRP at transmission to the noise power at the receiver.

With a given EIRP constraint and using 4 transmit antennas as an example, the algorithm provides around 2 dB performance gain (in terms of BER and PER) compared to the conventional scaled beamforming method, and around 1 dB gain compared to the conventional antenna selection method. It yields performance very close to that of using the optimal beamforming method (0.5 dB less than that of using the optimal beamforming method when 50 iterations are used). See Figures section.

Although the above described embodiments of the invention are intended to inform the reader as to the possibilities for implementation of the invention, the invention is not limited to such embodiments. Indeed, the reader will appreciate that many alternative embodiments, and modification, replacement or omission of individual features of the illustrated embodiments are possible within the scope of the invention. The invention should instead be read as being defined by the appended claims, which can be read in conjunction with, but should not be considered limited by, the present description and accompanying drawings.

The invention claimed is:

1. A method of determining a beamforming vector for use in wireless communication involving apparatus comprising a plurality of antennas, each being suitable for emitting a wireless signal, including determining said beamforming vector on the basis of a measure of transmission channel to a given receiver, said measure being expressible in the form of a channel matrix, the determining including determining an eigen-beamformer vector from said channel matrix and, for a number of iterations wherein the initial iteration is performed on a vector being said eigen-beamformer vector, rotating said eigen-beamformer vector into a reference direction in vector space to produce a rotated eigen-beamformer vector whose application would result in peak radiation being directed in said reference direction, sampling a radiation pattern associated with said rotated eigen-beamformer vector with respect to transmission direction, compressing the samples obtained from sampling the radiation pattern to reduce spatial directivity induced by said rotated eigen-beamformer vector, developing a rotated candidate beamformer on the basis of said compressed samples and returning said rotated candidate beamformer to the orientation of said eigen-beamformer vector before said rotating, thereby to produce a resultant vector and storing said resultant vector as a candidate vector;

then comparing said candidate vectors for said iterations and selecting that for use which best meets one or more selection criteria.

2. The method in accordance with claim 1 wherein a maximum number of iterations are performed.

3. The method in accordance with claim 1 wherein said iterating is terminated on two consecutive resultant vectors having corresponding selection criteria which are substantially equivalent.

4. The method in accordance with claim 3 wherein said consecutive resultant vectors are determined to have substantially equivalent selection criteria if the difference between corresponding respective selection criteria is less than a predetermined value.

5. The method in accordance with claim 1 wherein said one or more selection criteria comprises signal to noise ratio of an induced transmission using said resultant vector as a beamformer.

6. The method in accordance with claim 5 wherein said compressing comprises clipping said data using a clipping function.

7. The method in accordance with claim 6 wherein said clipping function comprises a cubic soft clipping function.

8. The method in accordance with claim 1 wherein said sampling of the radiation pattern comprises obtaining an inverse discrete Fourier transform of said beamforming vectors.

9. The method in accordance with claim 1 wherein said developing of a rotated candidate beamformer comprises obtaining a discrete Fourier transform of said compressed samples, and applying appropriate phase adjustment before said returning.

10. Wireless communications apparatus comprising a plurality of antennas, each antenna being suitable for emitting a wireless signal, and comprising a beamformer operable to determine a beamforming vector for use in wireless communication involving said apparatus, said beamformer including beamforming vector determining means for determining said beamforming vector on the basis of a measure of transmission channel to a given receiver, said measure being expressible in the form of a channel matrix, the beamforming vector determining means including eigen-beamformer vector determining means for determining an eigen-beamformer vector from said channel matrix and including, operable for a number of iterations wherein the initial iteration is performed on a vector being said eigen-beamformer vector:

vector rotation means for rotating said eigen-beamformer vector into a reference direction in vector space to produce a rotated eigen-beamformer vector whose application would result in peak radiation being directed in said reference direction, sampling means for sampling a radiation pattern associated with said rotated eigen-beamformer vector with respect to transmission direction, compressing means for compressing samples obtained from sampling the radiation pattern to reduce spatial directivity induced by said rotated eigen-beamformer vector, beamformer developing means for developing a rotated candidate beamformer on the basis of said compressed samples and returning said rotated candidate beamformer to the orientation of said eigen-beamformer vector before said rotating, thereby to produce a resultant vector and vector storing means for storing said resultant vector as a candidate vector; and result comparison means for comparing said candidate vectors for said iterations and to select that for use which best meets one or more selection criteria.

11. The wireless communications apparatus according to claim 10 and operable to perform up to a maximum number of iterations.

12. The wireless communications apparatus according to claim 10 and being operable to terminate said iterations on two consecutive resultant vectors having corresponding selection criteria which are substantially equivalent.

13. The wireless communications apparatus according to claim 11 and operable to determine that said consecutive resultant vectors have substantially equivalent selection criteria if the difference between corresponding respective selection criteria is less than a predetermined value.

14. The wireless communications apparatus according to claim 10 wherein said one or more selection criteria comprises signal to noise ratio of an induced transmission using said resultant vector as a beamformer.

15. The wireless communications apparatus according to claim 14 and operable to compress using a clipping function.

16. The wireless communications apparatus according to claim 15 wherein said clipping function comprises a cubic soft clipping function.

17. The wireless communications apparatus according to claim 10 and operable to sample said radiation pattern by way of obtaining an inverse discrete Fourier transform of said beamforming vectors.

18. The wireless communications apparatus according to claim 10 and operable to develop said rotated candidate beamformer by way of obtaining a discrete Fourier transform of said compressed samples, and by applying appropriate phase adjustment before said returning.

19. A non-transitory computer readable medium comprising computer executable instruction which, when executed by a computer, cause said computer to perform a method in accordance with claim 1.

* * * * *